US009244240B2

(12) United States Patent
Hayashishita

(10) Patent No.: US 9,244,240 B2
(45) Date of Patent: Jan. 26, 2016

(54) MULTI-CORE CABLE AND METHOD OF MANUFACTURING THE SAME

(71) Applicant: SUMITOMO ELECTRIC INDUSTRIES, LTD., Osaka-shi (JP)

(72) Inventor: Tatsunori Hayashishita, Aomori (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 166 days.

(21) Appl. No.: 13/923,731

(22) Filed: Jun. 21, 2013

(65) Prior Publication Data

US 2013/0343713 A1 Dec. 26, 2013

(30) Foreign Application Priority Data

Jun. 22, 2012 (JP) ................. 2012-140537

(51) Int. Cl.
| | |
|---|---|
| *G02B 6/44* | (2006.01) |
| *G02B 6/46* | (2006.01) |
| *H01B 11/20* | (2006.01) |
| *H01B 7/18* | (2006.01) |
| *H01B 11/18* | (2006.01) |

(52) U.S. Cl.
CPC ............... *G02B 6/4434* (2013.01); *G02B 6/46* (2013.01); *H01B 11/20* (2013.01); *H01B 7/182* (2013.01); *H01B 11/1891* (2013.01); *Y10T 29/49123* (2015.01)

(58) Field of Classification Search
None
See application file for complete search history.

(56) References Cited

U.S. PATENT DOCUMENTS 3,324,233 A * 6/1967 Bryant .................. 174/131 R
2011/0278043 A1* 11/2011 Ueda et al. ............... 174/115

FOREIGN PATENT DOCUMENTS

| CN | 201256005 Y | 6/2009 |
| JP | A-S58-163105 | 9/1983 |
| JP | 2007-169687 A | 7/2007 |

OTHER PUBLICATIONS

JP-UM-A-S57-033022 dated Feb. 20, 1982.

* cited by examiner

*Primary Examiner* — Sung Pak
(74) *Attorney, Agent, or Firm* — Drinker Biddle & Reath LLP

(57) ABSTRACT

A multi-core cable includes an insulated electronic wire arranged in the center of a cross-section of the cable, an insulated electronic wire arranged in proximity to the insulated electronic wire and having a diameter smaller than that of the insulated electronic wire, an even number of coaxial electronic wires arranged on the same circumference in the periphery of the insulated electronic wire and the insulated electronic wire, and a tensile strength fiber arranged in gaps between the coaxial electronic wires and the insulated electronic wire and the insulated electronic wire.

4 Claims, 1 Drawing Sheet

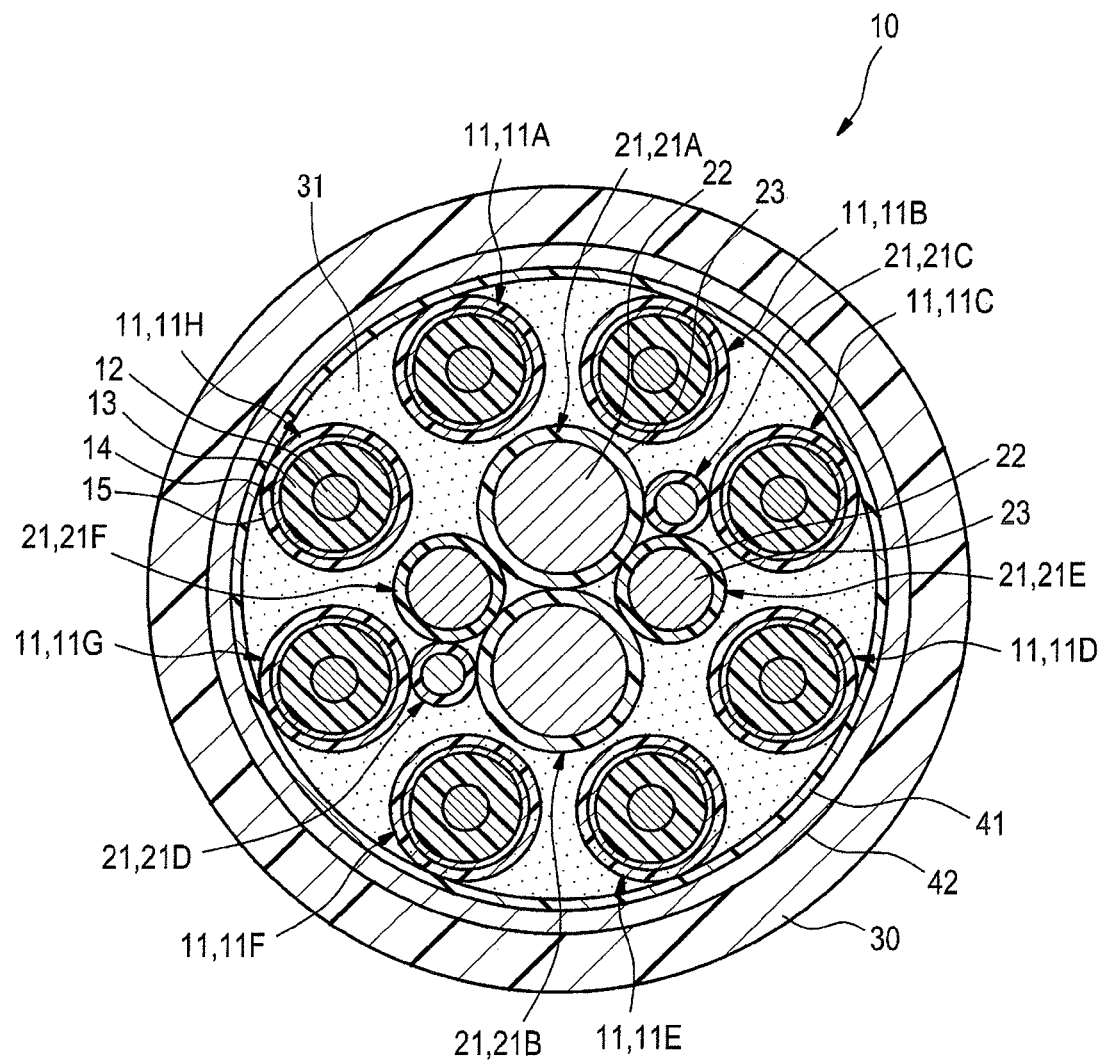

MULTI-CORE CABLE AND METHOD OF MANUFACTURING THE SAME

CROSS-REFERENCE TO RELATED APPLICATION(S)

The present application claims the benefit of priority of Japanese Patent Application No. 2012-140537, filed on Jun. 22, 2012. The disclosures of these applications are incorporated herein by reference.

BACKGROUND

1. Technical Field

The present invention relates to a multi-core cable having a plurality of insulated electronic wires and a plurality of coaxial electronic wires and a method of manufacturing the multi-core cable.

2. Related Art

A known multi-core cable using coaxial electronic wires is a cable in which a tension member is in the center of the cable and a coaxial cable or a coaxial cable unit is arranged in the periphery of the tension member (for instance, see patent literature 1).

LITERATURE OF RELATED ART

Patent Literature

[Patent Literature 1] JP-A-2007-169687

In recent years, a high-speed transmission progresses in a cable for a peripheral device which connects the peripheral device to a personal computer and an available frequency band is expanded to several GHz band. Further, as a transmitting system of a digital signal such as a video, a differential signal is mainly transmitted. In such a cable, it is likely that a high-speed signal is differentially transmitted by a plurality of coaxial electronic wires and a low-speed signal is transmitted or electric power is supplied by a plurality of insulated electronic wires. In the case of a multi-core cable having the plurality of insulated electronic wires and the plurality of coaxial electronic wires, any of the electronic wires in the cable may be broken when the cable is repeatedly bent, for example, at the time of wiring work of the cable.

SUMMARY

Exemplary embodiments of the invention provide a multi-core cable having a plurality of insulated electronic wires and a plurality of coaxial electronic wires and a method of manufacturing the multi-core cable, which can suppress a break in the cable.

A multi-core cable according to an exemplary embodiment of the invention comprises:

a first insulated electronic wire arranged in the center of a cross-section of the cable;

a second insulated electronic wire arranged in proximity to the first insulated electronic wire and having a diameter smaller than that of the first insulated electronic wire;

an even number of coaxial electronic wires arranged on the same circumference in the periphery of the first insulated electronic wire and the second insulated electronic wire; and a tensile strength fiber arranged in gaps between the coaxial electronic wires and the first insulated electronic wire and the second insulated electronic wire.

It is preferable that the first insulated electronic wire, the second insulated electronic wire and the coaxial electronic wires are collectively twisted.

A method of manufacturing a multi-core cable, according to an exemplary embodiment of the invention, comprises:

arranging a first insulated electronic wire in the center of a cross-section of the cable;

arranging a second insulated electronic wire having a diameter smaller than that of the first insulated electronic wire in proximity to the first insulated electronic wire;

arranging an even number of coaxial electronic wires on the same circumference in the periphery of the first insulated electronic wire and the second insulated electronic wire; and arranging a tensile strength fiber in gaps between the coaxial electronic wires and the first insulated electronic wire and the second insulated electronic wire.

It is preferable that the first insulated electronic wire, the second insulated electronic wire and the coaxial electronic wires are collectively twisted.

According to the exemplary embodiment of the present invention, the first large-diameter insulated electronic wire of the plurality of insulated electronic wires is arranged in the center of the cross-section of the cable. Then, the second insulated electronic wire with the small diameter is arranged in proximity to this first insulated electronic wire. Thus, the first insulated electronic wire and the second insulated electronic wire become likely not to being broken.

Further, the even number of coaxial electronic wires are arranged on the same circumference in the periphery of the first insulated electronic wire and the second insulated electronic wire, and the tensile strength fiber is arranged in gaps between the coaxial electronic wires and the insulated electronic wires. Thus, an outside diameter of the multi-core cable can be decreased and at the time of bending the multi-core cable, strain becomes likely not to occurring as a whole, and a break in the insulated electronic wire and the coaxial electronic wire is suppressed. Further, since arrangement of the coaxial electronic wires becomes stable, skew is likely not to occurring and good electrical properties can be obtained.

BRIEF DESCRIPTION OF THE DRAWINGS

FIG. 1 is a sectional view showing one example of a multi-core cable according to an exemplary embodiment of the present invention.

DETAILED DESCRIPTION

Now, an exemplary embodiment of a multi-core cable and a method of manufacturing the multi-core cable according to the present invention will be described below by referring to the drawing.

As shown in FIG. 1, the multi-core cable 10 according to the exemplary embodiment includes a plurality of coaxial electronic wires 11 for a high speed transmission and a plurality of insulated electronic wires 21 for power supply or a low speed signal inside a sheath 30 which is an outermost layer.

In the multi-core cable 10, in order to adapt the multi-core cable to a use for a differential transmission, the coaxial electronic wires 11 are accommodated with the two electronic wires respectively formed as a pair. In the multi-core cable 10 of this exemplary embodiment, as the coaxial electronic wires 11, four pairs of the coaxial electronic wires 11A and 11B, the coaxial electronic wires 11C and 11D, the coaxial electronic wires 11E and 11F and the coaxial electronic wires 11G and 11H are accommodated. Further, as the insulated electronic wires 21 of the multi-core cable 10, the insulated electronic wires 21A and 21B, the insulated electronic wires 21C and 21D and the insulated electronic wires 21E and 21F are accommodated. The number of coaxial electronic wires 11 is preferably about four to sixteen, and the number of insulated electronic wires 21 is preferably about three to nine.

Each of the coaxial electronic wires 11 has a structure that a central conductor 12 is coated with an insulator 13, an outer conductor 14 is arranged in an outer periphery of the insulator 13 and an outer side thereof is covered and protected with a jacket 15. As the coaxial electronic wire 11 for the high-speed transmission, a small diameter coaxial electronic wire thinner than AWG (American Wire Gauge) No. 30 is used. In this exemplary embodiment, a small diameter coaxial electronic wire of AWG No. 34 is used.

As the central conductor 12, a strand having an outside diameter of 0.192 mm is used that is formed by twisting seven silver-plated annealed copper wires of a conductor diameter of 0.064 mm.

As the insulator 13, for example, a fluorine resin of tetra fluoroethylene-hexa fluoropropylene copolymer (FEP) is used. The insulator 13 is formed by extrusion molding the fluorine resin. The insulator 13 has a thickness of 0.2 mm and an outside diameter of about 0.59 mm. Further, withstand voltage is about 1500 V.

The outer conductor 14 is formed, for example, by spirally winding a tin-plated annealed copper wire on the outer periphery of the insulator 13 and an outside diameter thereof is about 0.69 mm. The jacket 15 is formed by winding double a resin tape made of polyethylene terephthalate (PET). An outside diameter of the jacket 15 is about 0.72 mm.

Any of the insulated electronic wires 21 is formed by covering a conductor 22 with a jacket 23. The conductor 22 is formed, for example, with a strand made of a tin-plated annealed copper wire. Further, as a material of the jacket 23, a fluorine resin such as perfluoroalkoxy resin (PFA) is preferably used which is excellent in its heat resistance, chemical resistance, non-tacking, self-lubricating property or the like.

Insulated electronic wires (first insulated electronic wires) 21A, 21B of the plurality of insulated electronic wires 21 included in the multi-core cable 10 have the largest diameter. These insulated electronic wires 21A, 21B are arranged in the center of a cross-section of the multi-core cable 10. Insulated electronic wires (second insulated electronic wires) 21E, 21F have diameters smaller than those of the insulated electronic wires 21A, 21B, and insulated electronic wires (third insulated electronic wires) 21C, 21D have diameters smaller than those of the insulated electronic wires 21E, 21F. The insulated electronic wires 21E, 21F and the insulated electronic wires 21C, 21D are arranged in proximity to the insulated electronic wires 21A, 21B having the largest diameter.

A structural example of the insulated electronic wire 21 is shown. In the insulated electronic wires 21A and 21B, the conductor 22 with an outside diameter of 0.64 mm formed by twisting 19 element wires with a conductor diameter of 0.127 mm is covered with the jacket 23 to have an outside diameter of 0.76 mm. The insulated electronic wires 21A, 21B are thicker than the coaxial electronic wire 11 for the high-speed transmission. In the insulated electronic wires 21C and 21D, the conductor 22 with an outside diameter of 0.192 mm formed by twisting 7 element wires with a conductor diameter of 0.064 mm is covered with the jacket 23 to have an outside diameter of 0.31 mm. In the insulated electronic wires 21E and 21F, the conductor 22 with an outside diameter of 0.381 mm formed by twisting 7 element wires with a conductor diameter of 0.127 mm is covered with the jacket 23 to have an outside diameter of 0.51 mm.

In the multi-core cable 10 having the coaxial electronic wires 11 for the high-speed transmission and the insulated electronic wires 21, the insulated electronic wires 21 are arranged in the center and a space in the vicinity of the center in a cross-section vertical to a longitudinal direction of the cable (section in FIG. 1). Then, in the periphery of the insulated electronic wires 21, the coaxial electronic wires 11 for the high-speed transmission are arranged on the same circumference. In gaps between the coaxial electronic wires 11 and the insulated electronic wires 21, tensile strength fibers 31 such as aramide fibers or staple yarns are provided. Then, the plurality of insulated electronic wires 21 and the even number of coaxial electronic wires 11 are collectively spirally twisted together with the tensile strength fibers 31.

On the periphery of the plurality of insulated electronic wires 21 and the small diameter coaxial electronic wires 11 arranged in such a way, a tape wrapping 41 is wound. Thus, the small diameter coaxial electronic wires 11 and the insulated electronic wires 21 are bundled without putting their arrangement into disorder.

Further, the periphery of the plurality of small diameter coaxial electronic wires 11 and the insulated electronic wires 21 is covered with a shield layer 42 through the tape wrapping 41. Then, an outer peripheral side of the shield layer 42 is further covered with a sheath 30.

As the tape wrapping 41, for example, an electrically conductive resin tape is used. A resin tape forming the electrically conductive resin tape is formed with a fluorine resin such as polytetra fluoroethylene (PTFE) resin, or a polyester resin such as polyethylene terephthalate (PET) excellent in heat resistance, abrasion resistance or the like. In the electrically conductive resin tape used as the tape wrapping 41, in order to obtain an electric conductivity, an electrically conductive material such as carbon is mixed so as to be dispersed in a resin forming the resin tape. The tape wrapping 41 is formed in the shape of a film having a thickness of 0.01 mm or more and 0.08 mm or smaller. A winding direction of the tape wrapping 41 may be set to the same direction as or an opposite direction to a stranding direction in which the insulated electronic wires 21 and the small diameter coaxial electronic wires 11 are collected. An overlapping width of the electrically conductive resin tape used for the tape wrapping 41 is desirably set to ½ to ¼ times as wide as the width of the tape. A winding angle of the tape wrapping 41 is desirably set to 15 to 40° relative to the longitudinal direction of the cable. When the electrically conductive resin tape is wound, a tension of 1 to 5N is desirably applied to the tape.

The shield layer 42 is formed by spirally winding a tin-plated copper wire with an outside diameter of several ten μm or a copper alloy wire. The sheath 30 is formed with a polyvinyl chloride (PVC) or polyolefine resin or the like and an outside diameter of the sheath 30 is set to 4.0 mm or larger to 4.5 mm or smaller. In the multi-core cable 10 of the present exemplary embodiment including the eight small diameter coaxial electronic wires 11 of the AWG No. 34, a thickness of the sheath 30 is set to about 0.55 mm and an outside diameter is set to 4.3 mm. An outside diameter of the multi-core cable 10 is set to 2.5 mm or larger, and the upper limit is set to about 5 mm.

In the case of manufacturing the multi-core cable 10 of the exemplary embodiment configured in such a way, the insulated electronic wires 21A, 21B are arranged in the center of a cross-section of the cable, and the insulated electronic wires 21C, 21D and the insulated electronic wires 21E, 21F with diameters smaller than those of the insulated electronic wires 21A, 21B are arranged in proximity to the insulated electronic wires 21A, 21B. Then, the even number of coaxial electronic wires 11 are arranged on the same circumference in the periphery of the plurality of insulated electronic wires 21 and also, the tensile strength fibers 31 are arranged in gaps between the coaxial electronic wires 11 and the insulated electronic wires 21. The even number of coaxial electronic wires 11 and the plurality of insulated electronic wires 21 are collectively twisted. The tape wrapping 41 is wound on the periphery of the coaxial electronic wires 11 and the insulated electronic wires 21, and the shield layer 42 is further foimed on the outer periphery of the tape wrapping 41. Then, the outer periphery of this shield layer 42 is covered with the sheath 30 by extrusion.

According to the multi-core cable 10 of the exemplary embodiment, the largest-diameter insulated electronic wires 21A, 21B of the plurality of insulated electronic wires 21 are arranged in the center of the cross-section of the cable. Then, the insulated electronic wires 21C, 21D and the insulated electronic wires 21E, 21F with diameters smaller than those of the insulated electronic wires 21A, 21B are arranged in a position proximal to these insulated electronic wires 21A, 21B. Thus, each of the plurality of insulated electronic wires 21 with different diameters becomes likely not to being broken.

Further, the even number of coaxial electronic wires 11 are arranged on the same circumference in the periphery of the plurality of insulated electronic wires 21, and the tensile strength fibers 31 are arranged in gaps between the coaxial electronic wires 11 and the insulated electronic wires 21. Thus, an outside diameter of the multi-core cable 10 can be decreased as compared with a cable structure in which a tension member is arranged in the center of a cross-section. Then, at the time of bending the multi-core cable 10, strain is likely not to occurring in the insulated electronic wires 21 and the coaxial electronic wires 11 and even when the multi-core cable 10 is repeatedly bent, the insulated electronic wires 21 and the coaxial electronic wires 11 are likely not to being broken. Moreover, since arrangement of the coaxial electronic wires 11 becomes stable, skew is likely not to occurring and good electrical properties can be obtained. Further, since the plurality of insulated electronic wires 21 and the even number of coaxial electronic wires 11 are collectively twisted together with the tensile strength fibers 31, the arrangement of the coaxial electronic wires 11 becomes more stable.

In the multi-core cable 10, since the tape wrapping 41 formed with the electrically conductive resin tape is wound on the periphery of the plurality of coaxial electronic wires 11 for the high-speed transmission, an increase in a quantity of attenuation in the coaxial electronic wires 11 can be suppressed as much as possible by the tape wrapping 41 and the shield layer 42 in the periphery thereof, so that a good electrical property can be obtained. Accordingly, the multi-core cable 10 can be preferably used as a cable for transmitting a differential signal in a high frequency band.

The number of the small diameter coaxial electronic wires 11 and the insulated electronic wires 21 in the multi-core cable 10 of the above-described exemplary embodiment is not limited to that of the exemplary embodiment. Further, the plurality of coaxial electronic wires 11 may be configured to be arranged on the same circumference of a plurality of layers.

What is claimed is:
1. A multi-core cable comprising:
    a first insulated electronic wire arranged in the center of a cross-section of the cable;
    a second insulated electronic wire arranged in proximity to the first insulated electronic wire and having a diameter smaller than that of the first insulated electronic wire;
    an even number of coaxial electronic wires arranged on the same circumference in the periphery of the first insulated electronic wire and the second insulated electronic wire, the coaxial electronic wires having a structure that a central conductor is coated with an insulator, and an outer conductor is spiral wound on an outer periphery of the insulator and an outer side thereof is covered with a resinous jacket; and
    a tensile strength fiber arranged in gaps between the coaxial electronic wires and the first insulated electronic wire and the second insulated electronic wire.
2. The multi-core cable as claimed in claim 1, wherein the first insulated electronic wire, the second insulated electronic wire and the coaxial electronic wires are collectively twisted.
3. A method of manufacturing a multi-core cable, comprising:
    arranging a first insulated electronic wire in the center of a cross-section of the cable;
    arranging a second insulated electronic wire having a diameter smaller than that of the first insulated electronic wire in proximity to the first insulated electronic wire;
    arranging an even number of coaxial electronic wires on the same circumference in the periphery of the first insulated electronic wire and the second insulated electronic wire, the coaxial electronic wires having a structure that a central conductor is coated with an insulator, and an outer conductor is spiral wound on an outer periphery of the insulator and an outer side thereof is covered with a resinous jacket; and
    arranging a tensile strength fiber in gaps between the coaxial electronic wires and the first insulated electronic wire and the second insulated electronic wire.
4. The method of manufacturing a multi-core cable as claimed in claim 3, comprising:
    twisting collectively the first insulated electronic wire, the second insulated electronic wire and the coaxial electronic wires.

* * * * *